US011921986B1

United States Patent
Ganesh

(10) Patent No.: US 11,921,986 B1
(45) Date of Patent: Mar. 5, 2024

(54) SYSTEM AND METHOD FOR WEB PAGE NAVIGATION BEHAVIOR

(71) Applicant: OPEN TEXT HOLDINGS, INC., Menlo Park, CA (US)

(72) Inventor: Praveen Ganesh, Krishnagiri (IN)

(73) Assignee: OPEN TEXT HOLDINGS, INC., Menlo Park, CA (US)

(*) Notice: Subject to any disclaimer, the term of this patent is extended or adjusted under 35 U.S.C. 154(b) by 0 days.

(21) Appl. No.: 17/954,065

(22) Filed: Sep. 27, 2022

(51) Int. Cl.
- *G06F 3/0483* (2013.01)
- *G06F 3/04817* (2022.01)
- *G06F 16/954* (2019.01)
- *G06F 16/957* (2019.01)
- *G06F 40/143* (2020.01)
- *G06F 40/205* (2020.01)

(52) U.S. Cl.
CPC ........ *G06F 3/0483* (2013.01); *G06F 3/04817* (2013.01); *G06F 16/954* (2019.01); *G06F 16/9577* (2019.01); *G06F 40/143* (2020.01); *G06F 40/205* (2020.01)

(58) Field of Classification Search
CPC .. G06F 3/0483; G06F 3/04817; G06F 16/954; G06F 16/9577; G06F 40/143; G06F 40/205
See application file for complete search history.

(56) References Cited

U.S. PATENT DOCUMENTS

| | | | | |
|---|---|---|---|---|
| 11,621,948 B2* | 4/2023 | Levy | H04L 63/068 | 726/6 |
| 2009/0327947 A1* | 12/2009 | Schreiner | G06F 3/0483 | 715/777 |
| 2011/0271217 A1* | 11/2011 | Cruz Moreno | G06F 3/0482 | 715/765 |
| 2011/0307738 A1* | 12/2011 | Hilerio | G06F 8/61 | 715/810 |
| 2012/0066634 A1* | 3/2012 | Kim | G06F 16/9535 | 715/777 |
| 2012/0131441 A1* | 5/2012 | Jitkoff | G06Q 30/0641 | 715/234 |
| 2014/0040825 A1* | 2/2014 | Homma | G03G 15/5087 | 715/810 |
| 2014/0325425 A1* | 10/2014 | Milam | G06F 3/0482 | 715/777 |
| 2016/0103573 A1* | 4/2016 | Jones | G06F 3/0483 | 715/777 |
| 2022/0107712 A1* | 4/2022 | Mattox, Jr. | G06F 9/451 | |

FOREIGN PATENT DOCUMENTS

| | | |
|---|---|---|
| CN | 102024061 A | 4/2011 |
| CN | 102073452 B | 4/2013 |

* cited by examiner

Primary Examiner — Keith D Bloomquist
(74) Attorney, Agent, or Firm — SPRINKLE IP LAW GROUP

(57) ABSTRACT

A method for enhanced website navigation comprises receiving a first web page at a web browser, parsing the HTML of the web page to identify a favicon, associating the favicon with a link to a second web page and displaying the first web page in the browser window in a browser tab that includes the favicon. The method further includes listening for a user interface event with respect to the favicon portion of the tab and navigating to the second web page based on the user interface event with respect to the favicon portion of the tab.

22 Claims, 7 Drawing Sheets

US 11,921,986 B1

SYSTEM AND METHOD FOR WEB PAGE NAVIGATION BEHAVIOR

TECHNICAL FIELD

This disclosure relates to the field of web page navigation. Even more particularly, embodiments of this disclosure relate to web page navigation using web page tabs.

BACKGROUND

In computer software interfaces, tabs provide a mechanism for switching between multiple documents, pages, or other contents open in the same program window. Traditionally, each tab is a clickable graphical user interface element that is associated with a document, page, or other contents and that, when selected, causes the program to display the tab's contents in the window. The program typically continues to display the other tabs in the program window while hiding the contents of those tabs. The tabs may be arranged horizontally in a single row or in multiple rows or vertically in a single column or in multiple columns. Other arrangements of tabs may also be used.

Tabbed browsing is a feature of web browsers that allows a user to open several web pages in the same browser window and switch between those pages. Each browser tab comprises a clickable area in the graphical user interface that, when selected, causes the program to display the web page open in that tab and hide the contents of the other tab. Tabbed browsing eliminates the inconvenience of managing multiple tiled windows when browsing several web pages at a time and consumes less memory and operating system resources than opening each page in a different window.

SUMMARY

Embodiments of the present disclosure provide systems and methods for enhanced web page navigation using a tabbed interface.

One embodiment of a method for web navigation using a tabbed interface includes receiving a first web page at a web browser; parsing the HTML of the first web page to identify a favicon, associating the favicon with a link to a second web page, displaying the first web page in a browser tab that includes the favicon, listening for a user interface event with respect to the favicon and requesting the second web page in response to detecting the user interface event.

Another embodiment includes a computer program product comprising a non-transitory, computer-readable medium storing thereon a set of computer-executable instructions. The set of computer-executable instructions comprises instructions for receiving a first web page, parsing the HTML of the first web page to identify a favicon, associating the favicon with a link to a second web page, displaying the first web page in a browser tab that includes the favicon, listening for a user interface event with respect to the favicon in the browser tab, and requesting the second web page in response to detecting the user interface event with respect to the favicon.

Yet another embodiment includes a web navigation system. The web navigation system comprises an input device, a display device, a processor coupled to the input device and the display device, and a memory coupled to the processor. The memory stores a web browser that comprises computer-executable instructions for receiving a first web page, parsing the HTML of the first web page to identify a favicon, associating the favicon with a link to a second web page, and displaying the first web page in a browser tab of a browser window rendered on the display device, the browser tab including the favicon. The web browser further includes computer-executable instructions for listening for a user interface event with respect to the favicon in the browser tab and requesting the second web page in response to detecting the user interface event with respect to the favicon. In one embodiment, the second web page is opened in the same tab. In another embodiment, the second web page is opened in a new tab. In one embodiment, the web browser comprises a web browser extension that comprises at least a portion of the set of computer-executable instructions.

One aspect of the present disclosure includes requesting the first web page from a website that includes a home page and the first web page, and linking the favicon to the home page such that the browser opens the home page based on detecting the user interface event with respect to the favicon portion of the tab.

Another aspect of the present disclosure includes parsing the HTML of the first web page for a base tag specifying a uniform resource locator (URL), extracting the URL from the base tag, and associating the favicon with the URL extracted from the base tag.

Yet another aspect of the present disclosure includes determining a domain name with which the first web page is associated and associating the favicon with the domain name.

Another aspect of the present disclosure includes storing tab configuration data for the web browser. According to one embodiment, the tab configuration data comprises a user specified URL to associate with the first web page. In accordance with one embodiment, associating the favicon with the link to the second web page comprises associating the favicon with the user specified URL.

Yet another aspect of the present disclosure comprises registering an event listener to listen for a click event on the favicon.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

DETAILED DESCRIPTION

Figure 1:
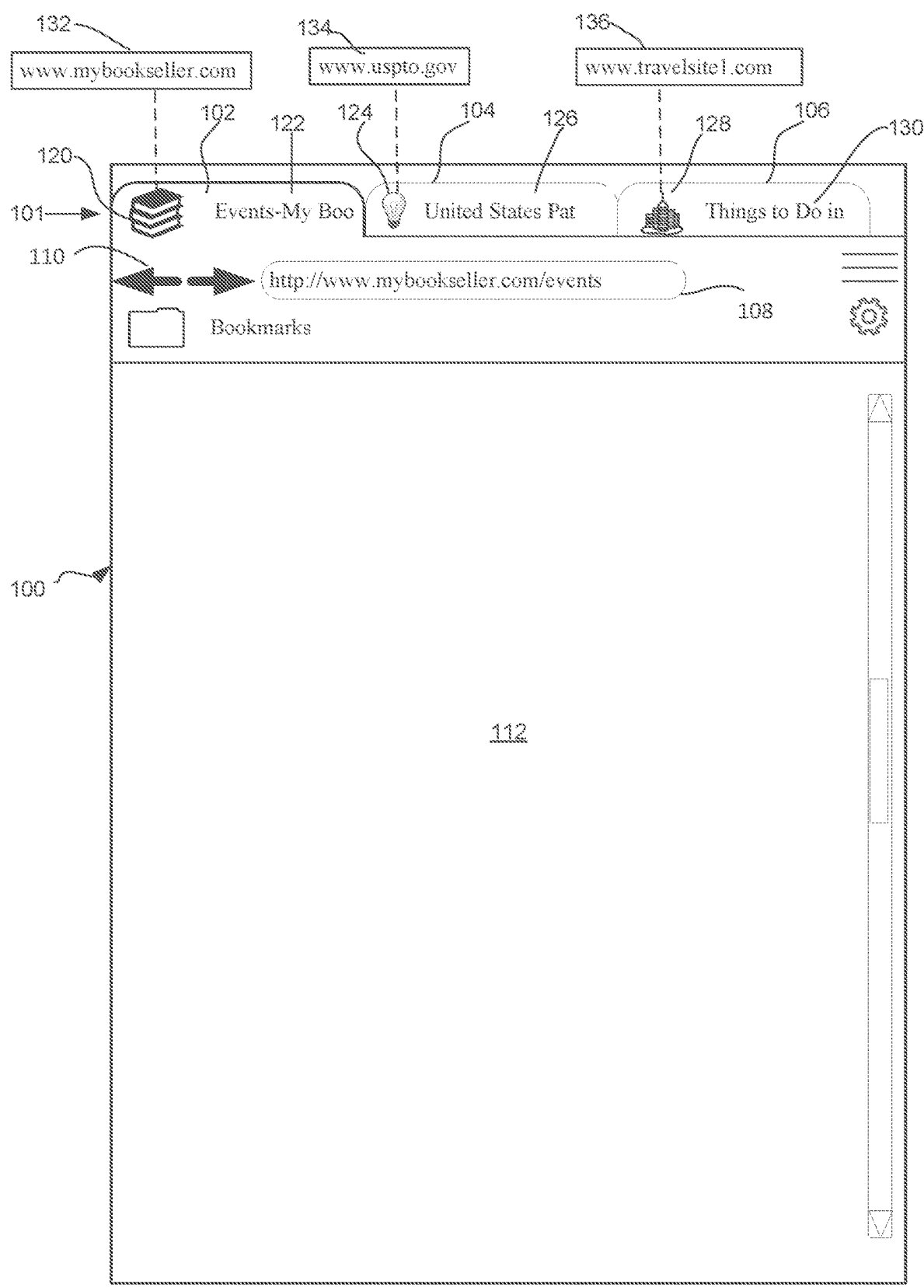
FIG. 1 is a diagrammatic representation of one embodiment of a web browser window with multiple open tabs.

The invention and the various features and advantageous details thereof are explained more fully with reference to the non-limiting embodiments that are illustrated in the accompanying drawings and detailed in the following description. Descriptions of well-known starting materials, processing techniques, components, and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions, and/or rearrangements within the spirit and/or scope of the underlying inventive concept will become apparent to those skilled in the art from this disclosure.

Before proceeding, some additional context may be helpful. It is common for users to open multiple browser tabs when researching on a website. Opening different pages in different tabs allows the user to easily switch between the open pages relevant to the user's research. When the user is done with a particular page or line of research in a tab, the user may want to navigate back to the website's home page. Typically, the user would do this by entering the uniform resource locator (URL) of the website's home page into the browser's navigation bar to open the home page in the, using the browser's back button if the user had navigated from the home page to the current page in the same tab, or by selecting the home page from the browser's browsing history.

Embodiments of the present disclosure provide systems and methods for tabbed browsing. Unlike prior browser tabs that simply allow a user to switch between open web pages in the browser window, the present disclosure provides tabs with enhanced navigation features. More particularly, a tab can include a tab icon, a tab title, or other graphical user interface element that is linked to a document, such as a web page. According to one embodiment, the linked element is rendered as an interactive element on which the user can click. Other areas of the tab are also rendered as an interactive element on which the user can click to switch to the tab or take other actions.

The web browser listens for user interface events on the linked element portion of the tab and other portions of the tab. When the web browser detects a specified user interface event on the linked element portion of the tab, the web browser takes an action with respect to the tab. By way of example, but not limitation, the browser opens the linked document. In some embodiments, the web browser opens the linked document in the same tab, replacing the document previously opened in that tab. In other embodiments, the web browser opens the linked document in a new background tab. In yet other embodiments, the web browser opens the linked document in a new foreground tab. The enhanced tabs of the present disclosure allow the user to easily navigate to web pages or other documents, including those not already open in the browser window.

FIG. 1 is a diagrammatic representation of one embodiment of a web browser window 100 for a web browser that supports tabbed browsing. Web browser window includes a tag strip 101 in which open tabs are displayed. In the example of FIG. 1, three tabs are open (tab 102, tab 104, tab 106) in browser window 100. Generally, each open tab in browser window 100 remains visible in tag strip 101 of browser window 100 even if the tab's contents are not displayed. In some embodiments, however, the web browser may hide some tabs from view so that the tab itself is not visible in the tab strip. This behavior may be based, for example, on the number of tabs open in browser window 100 and the size of browser window 100. Browser window 100 further includes an address bar 108, navigation tools 110 to go back and forward pages, and a main display area 112 to display web pages and other documents. Browser window 100 may also include other controls, such as controls to open new tabs, various menus and other tools.

The tabs in browser window 100 provide visual indications of the web pages or other documents open in browser window 100, including documents that are not currently in the foreground of browser window 100, and a mechanism to allow a user to easily switch between the documents open in browser window 100. While the tabs of FIG. 1 are arranged horizontally in a single row, the tabs may be organized in different ways in browser window 100, such as, but not limited to, in multiple rows across the width of browser window 100 or in one or more vertical columns next to main display area 112.

Each tab in browser window 100 has an associated set of tab information in the web browser. In one embodiment, each tab is represented by its own object that embodies the tab information. The tab information for a tab, in one embodiment, comprises a tab id, a tab document URL, a tab title, a tab icon URL, a tab link URL, and tab state information. The tab information may also include additional or alternative information.

The tab id is an identifier for a tab that identifies a specific tab within browser window 100. According to one embodiment, the tab id is unique within a browser session.

A tab document URL is the URL of the document (e.g., web page) open in the tab. In one embodiment, the tab document URL is the URL of the document displayed in the tab. In another example, the tab document URL is the last committed URL in a main frame of the tab. Using the example of tab 102, tab 104, and tab 106, the tab document URL of tab 102 is www.mybookseller.com/events, the tab document URL for tab 104 is www.uspto.gov/patents and the tab document URL for tab 106 is www.travelsite1.com/city/thingstodo.

The tab title is a string that serves as the title of the tab. In one embodiment, the tab title is extracted from the title tag of the web page opened in the tab.

The tab icon URL is the URL of the tab icon. In one embodiment, the tab icon URL is the favicon URL extracted from the web page opened in the tab.

The tab link URL is the URL to which a linked tab element is linked. Using the example of tab 102, tab 104, and tab 106, the tab link URL of tab 102 is www.mybookseller.com, the tab link URL for tab 104 is www.uspto.gov and the tab link URL for tab 106 is www.travelsite1.com. In one embodiment, the tab link URL is extracted from the base tag of the web page opened in the tab.

Tab state information includes information about the state of a tab. According to one embodiment, the tab state information comprises an indication of whether the tab is active in its browser window (e.g., browser window 100). Other examples of tab state information include, but are not limited to, an indication of whether the tab is visible, an indication of whether a tab is hidden, an indication of whether the tab is highlighted.

Each tab open in browser window 100 is associated with a respective web page or other document open in browser window 100 as specified, for example, by the tab document URL. In the illustrated embodiment of FIG. 1, tab 102 is associated with the web page www.mybookseller.com/events, tab 104 is associated with the web page www.uspto.gov/patents and tab 106 is associated with the web page www.travelsite1.com/city/thingstodo.

Each tab in browser window 100 further includes features that help identify the document that is open in the tab. In some embodiments, these features include a text element and a graphics element. One example of a graphics element is a tab icon, which comprises a small image displayed as part of the tab. One example of a text element is a tab title that provides text to help the user identify the document open in the tab. For example, tab 102 includes tab icon 120 and tab title 122, tab 104 includes tab icon 124 and tab title 126, and tab 106 includes tab icon 128 and tab title 130. In one embodiment, the tab icon is retrieved from the favicon URL specified by the associated web page opened in the tab and the tab title extracted from the title tag of the web page. Tabs may further include additional or alternative graphics elements or text elements depending on implementation. By way of example, but not limitation, a tab may include a tab preview element, which is a small image (thumbnail) of the document open in the tab.

A portion of each tab open in browser window 100 is linked to a web page or other document. For example, at least one of the tab icon, the tab title, or another tab element is linked to a web page or other document. FIG. 1, for example, tab icon 120 is linked to www.mybookseller.com (link 132), tab icon 124 is linked to www.uspto.gov (link 134) and tab icon 128 is linked to www.travelsite1.com (link 136). Each tab also includes a portion that is not linked to the document. The linked document is specified, in one embodiment, by a tab link URL in the tab information for the tab. The tab information for the tab also, in some embodiments, specifies the element to be linked to the linked document.

Each tab in browser window 100 comprises a graphical user interface element with which the user can interact. In one embodiment, a tab comprises a graphical user interface element portion that is linked to a linked document and a second portion that is not linked to the linked document. The linked portion of each tab and the second portion of each tab may exhibit various behaviors depending on whether the tab is in the foreground of browser window 100.

In the example of FIG. 1, the tab icons are rendered as interactive elements linked to the respective linked documents and the remainders of the tabs are also rendered as interactive elements with which the user can interact. Thus, tab 102 includes a linked tab icon portion linked to the linked web page www.mybookseller.com and a second interactive portion that is not linked to the web page, tab 104 includes a linked tab icon portion linked to www.uspto.gov and a second interactive portion that is not linked to the web page, and tab 106 includes a linked tab icon 128 linked to www.travelsite1.com and a second interactive portion that is not linked to the web page.

The web browser listens for user interface events on the linked element portions of the tabs and the other portions of the tabs. In the embodiment of FIG. 1, for example, the web browser listens for events on tab icon 120 portion of tab 102, events on the remainder of tab 102, events on tab icon 124 portion of tab 104, events on the remainder of tab 104, events on tab icon 128 portion of tab 106 and events on the remainder of tab 106. When the web browser detects a specified user interface event on a tab, the web browser may take an action. In some embodiments, the web browser determines at least one of whether to take an action or which action to take based on one or more of the event detected, the portion of the tab on which the event was detected, or the state of the tab on which the event occurred.

In general, when the user clicks on or otherwise generates a specified type of user interface event on a portion of a tab that is not linked to a linked document, the browser can process the event. In some embodiments, the event is ignored if the tab selection event is on the active tab. If the user interacts with a portion of a non-active tab that is not a linked to a linked document (e.g., by clicking the portion) to generate a specified user interface event on that portion (e.g., by clicking the portion), the browser makes that tab the active tab, brings the tab to the foreground of browser window 100 and displays the document that is open in that tab in main display area 112.

In FIG. 1, for example, tab 102 is active and the browser displays the corresponding web page retrieved from www.mybookseller.com/events in display area 112. Tab 104 and tab 106 are non-active tabs (though events may still be occurring in those tabs) and the browser hides the respective documents that are open in those tabs. Tab 104 and tab 106 in FIG. 1 can thus be considered background tabs. If the user interacts with a portion of tab 102 other than the linked tab icon 120 portion to generate a specified user event on that portion, the browser may ignore the event because tab 102 is already active. If the user interacts with tab 104 to generate a specified user interface event on a portion of tab 104 other than the linked tab icon 124 portion, the browser makes tab 104 the active tab, brings tab 104 to the foreground, displays the contents of tab 104 (that is, the web page retrieved from www.uspto.gov/patents), hides the contents of tabs 102, 104 and designates tabs 102, 104 as non-active. Similarly, if the user interacts with tab 106 to generate a specified user interface event on a portion of tab 106 other than the linked tab icon 128 portion, the browser makes tab 106 the active tab, brings tab 106 to the foreground, displays the contents of tab 106 (that is, the web page retrieved from www.uspto.gov/patents), hides the contents of tab 102, 104 and designates tabs 102, 104 as non-active. In other embodiments, the browser supports tiled tabs in which the contents of multiple tabs can be displayed simultaneously in main display area 112.

Returning to the example in which tab 102 is the active tab, when the user selects (e.g., clicks on) the tab icon 120 of the active tab 102, the browser opens the linked web page www.mybookseller.com, either from cache, if available, or from the website. In some embodiments, the web browser opens the linked web page www.mybookseller.com in tab 102. In other embodiments, the web browser opens the linked web page in a new background tab but maintains tab 102 as the active tab in the foreground. In yet another embodiment, the web browser opens the linked page in a new tab in the foreground—for example, opens www.mybookseller.com in a new tab and designates that tab as active, making tab 102 a non-active background tab.

If the user clicks on a linked element portion of a non-active tab, the web browser of one embodiment brings that tab to the foreground of browser window 100 but does not open the linked document. For example, if in FIG. 1, the user clicks on tab icon 124, the web browser makes tab 104 active, brings tab 104 to the foreground to display the contents of tab 104 (that is, the web page retrieved from www.uspto.gov/patents) in main display area 112, hides the contents of tab 102 and designates tab 102 as non-active, but does not open the linked page www.uspto.gov.

In another embodiment, if the user clicks on the portion of a background tab that is linked to a web page, the browser opens the linked web page. For example, in FIG. 1, if the user clicks on tab icon 124, the web browser opens www.uspto.gov. In one embodiment, the browser makes tab 104 active, brings tab 104 to the foreground, and opens www.uspto.gov in tab 104. In another embodiment, the browser makes tab 104 active, brings tab 104 to the foreground to display www.uspto.gov/patents in display area 112 and opens www.uspto.gov in a new background tab. In still another embodiment, the browser maintains tab 104 as a background tab and opens www.uspto.gov in a new background tab, leaving tab 102 as the active tab in the foreground.

Embodiments described herein facilitate navigation of complex websites. In some embodiments, the tab icon or tab title of a tab is linked to the home page of the website from which the page currently open in the tab was requested. Thus, in a complex research session in which a user may have drilled deep into a website in multiple tabs, the tabs can be used to not only switch between those pages but also to quickly navigate back to the home page.

Figure 2:
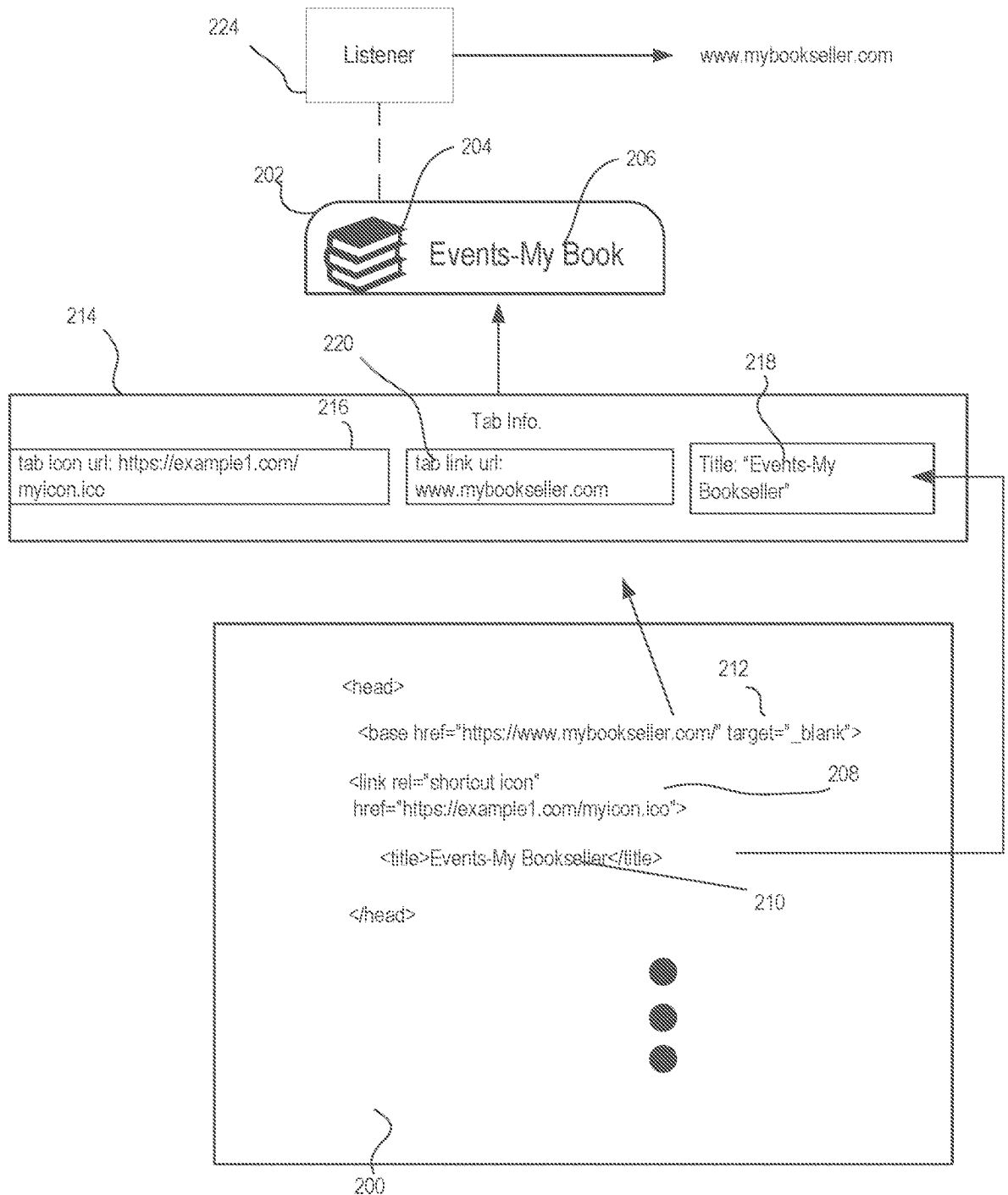
FIG. 2 is a diagrammatic representation of one embodiment of parsing a web page to configure a tab.

FIG. 2 illustrates one embodiment of a browser processing a portion of the HTML for a web page 200 to generate a tab 202 that includes a tab icon 204 and a tab title 206. In this example, web page 200 is opened from the URL www.mybookseller.com/events. According to one embodiment, the browser parses the HTML for known patterns or tags to identify a favicon URL 208 that specifies the location of a favicon for the web page, a title tag 210 that includes the title of the web page and a base reference tag 212 ("base tag") that specifies a base URL for the web page.

The web browser generates a set of tab information 214 for the tab 202, including a tab icon URL 216, a tab title 218, and a tab link URL 218. According to one embodiment, the web browser extracts the favicon URL 208, the title from title tag 210 and the base reference URL from base reference tag 212 to generate at least a portion of tab information 214. More particularly, the browser extracts the favicon URL 208 as a tab icon URL 216, extracts the URL from base tag 212 as a tab link URL 218, and extracts the title from title tag 210 as the tab title 220. The tab information may also include other information for tab 202, such as the tab document URL (e.g., www.mybookseller.com/events in this example), tab id, tab state information, or other information about tab 202. In some embodiments, tab information 214 or a browser configuration specifies which element of the tag is to be linked to the tab link URL. In other embodiments, the browser is coded to use a particular element as the linked element.

In operation, the web browser retrieves the tab icon from the tab icon URL (e.g., the favicon URL) and generates tab 202 that includes the tab icon 204 (e.g., the favicon specified by the web page) and the title extracted from title tag 210 as the tab title 206. Further, the web browser registers a listener to listen for specified events, such as particular user click events, on tab 202, including events on the linked element portion of tab 202 and events on the portion of tab 202 that is not the linked element portion. In the embodiment of FIG. 2, the web browser registers listener 224 to listen for specified events, such as user click events, on the tab icon 204 portion of tab 202 and events on the non-tag icon portion of tab 202. If listener 224 detects a specified event, the web browser may take an action. In some embodiments, the action depends on the current status of the tab (e.g., whether the tab is the current tab, active tab, visible tab, or has some other status including combination of statuses), the event detected, or the portion of tab 202 on which the event was detected or other factors.

According to one embodiment, if listener 224 detects a specified user interface event on a portion of tab 202 other than the tab icon 204 portion of tab 202 and tab 202 is the active tab, the web browser ignores the event. On the other hand, if listener 224 detects a specified user interface event on a portion of tab 202 other than the tab icon 204 portion of tab 202 and tab 202 is not the active tab, the web browser makes tab 202 the active tab and displays the contents of tab 202 (e.g., web page 200) in the main display area of the browser.

According to one embodiment, if listener 224 detects a specified user interface event on a linked portion of tab 202, and the tab is the active tab, the browser requests the linked document. For example, if the user selects (e.g., clicks on) the tab icon 204 of tab 202 and tab 202 is the active tab, the browser opens the linked web page www.mybookseller.com, either from cache, if available, or from the website. In some embodiments, the web browser opens the linked web page www.mybookseller.com in tab 202. In other embodiments, the web browser opens the linked web page in a new background tab but maintains tab 202 as the active tab in the foreground. In yet another embodiment, the web browser opens the linked page in a new tab in the foreground—for example, opens www.mybookseller.com in a new tab and designates that tab as active, making tab 202 a non-active background tab.

If the user selects (e.g., clicks on) the tab icon 204 of tab 202 and tab 202 is not the active tab, the web browser makes tab 202 the active tab and brings tab 202 to the foreground of the browser window, but does not open the linked document www.mybookseller.com.

In another embodiment, if the user selects tab icon 204 of tab 202 and tab 202 is not the active tab, the browser opens the linked web page www.mybookseller.com. In one embodiment, the browser makes tab 202 the active tab, brings tab 202 to the foreground, and opens www.uspto.gov in tab 202. In another embodiment, the browser makes tab 202 the active tab, brings tab 202 to the foreground to display www.mybookseller.com/events in the main display area of the browser window and opens www.mybookseller.com in a new background tab. In still another embodiment, the browser maintains tab 202 as a background tab and opens www.mybookseller.com in a new background tab.

Figure 3:
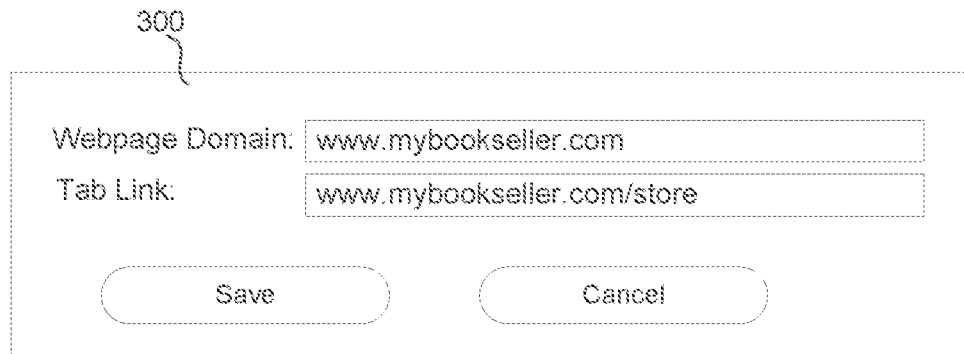
FIG. 3 is a diagrammatic representation of one embodiment of a user interface for configuring tabs.

In the embodiment of FIG. 2, the tab link to which a tab element is linked is extracted from the web page. In addition, or in the alternative, the tab link may be set in the configuration settings of the web browser. FIG. 3, for example, is a diagrammatic representation of one embodiment of a user interface 300 for configuring tabs. In the embodiment of FIG. 3, a user specifies a web page domain and the tab link for that web page domain. In one embodiment of FIG. 3, the browser will link the tab icon or another tab element of tabs in which pages from the domain www.mybookseller.com are opened to www.mybookseller.com/store. Using the example of FIG. 2, but with the browser using the tab configuration data of FIG. 3, the browser sets the tab link URL 218 to www.mybookseller.com/store because www.mybookseller.com/events is from the domain www.mybookseller.com. Thus, in such an embodiment, the browser links tab icon 204 to www.mybookseller.com/store. According to one embodiment, the user can set tab link URLs for multiple domains, including different tab link URLs for different domains.

Figure 4:
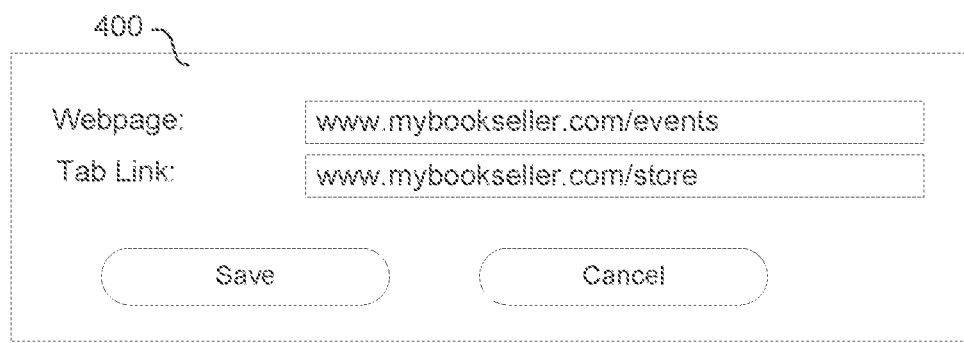
FIG. 4 is a diagrammatic representation of another embodiment of a user interface for configuring tabs.

FIG. 4, for example, is a diagrammatic representation of one embodiment of a user interface 400 for configuring tabs. In the embodiment of FIG. 4, a user specifies a web page and the tab link for that web page. In one embodiment of FIG. 4, the browser will link the tab icon or other element of tabs in which instances of the web page from www.mybookseller.com/events are opened to www.mybookseller.com/store. Using the example of FIG. 2, but with the browser using the configuration data of FIG. 4, the browser sets the tab link URL 218 to www.mybookseller.com/store based on opening www.mybookseller.com/events in tab 202. Thus, in such an embodiment, the browser links tab icon 204 to www.mybookseller.com/store. According to one embodiment, the user can set tab link URLs for multiple web pages, including different tab link URLs for different web pages.

Figure 5:
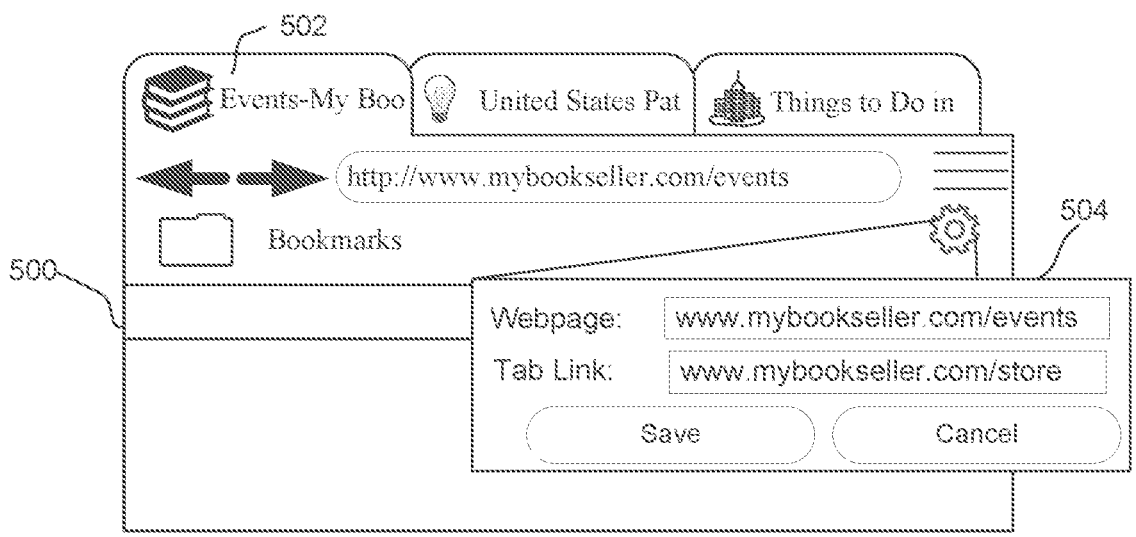
FIG. 5 is a diagrammatic representation of another embodiment of a user interface for configuring tabs.

In the embodiments of FIG. 3 and FIG. 4, the tab configuration data is set as browser-level configuration data. In addition, or in the alternative, tab configuration data can be set at the tab level. FIG. 5, for example, illustrates another embodiment of a user interface for setting tab configuration data. More particularly, FIG. 5 illustrates a browser window 500 having three tabs open, including an active tab 502. The browser window also includes a settings icon that when clicked opens a user interface 504 for configuring the active tab. In this embodiment, the tab configuration data is specific to tab 502. Here, the user can specify the tab link URL for a web page. In addition, or in the alternative, the user can specify the tab link URL for a domain. According to one embodiment, the user can set tab link URLs for multiple web pages, including different tab link URLs for different web pages. In addition, or in the alternative, the user can specify the tab link URL for multiple domains including different tab link URLs for different domains.

Figure 6:
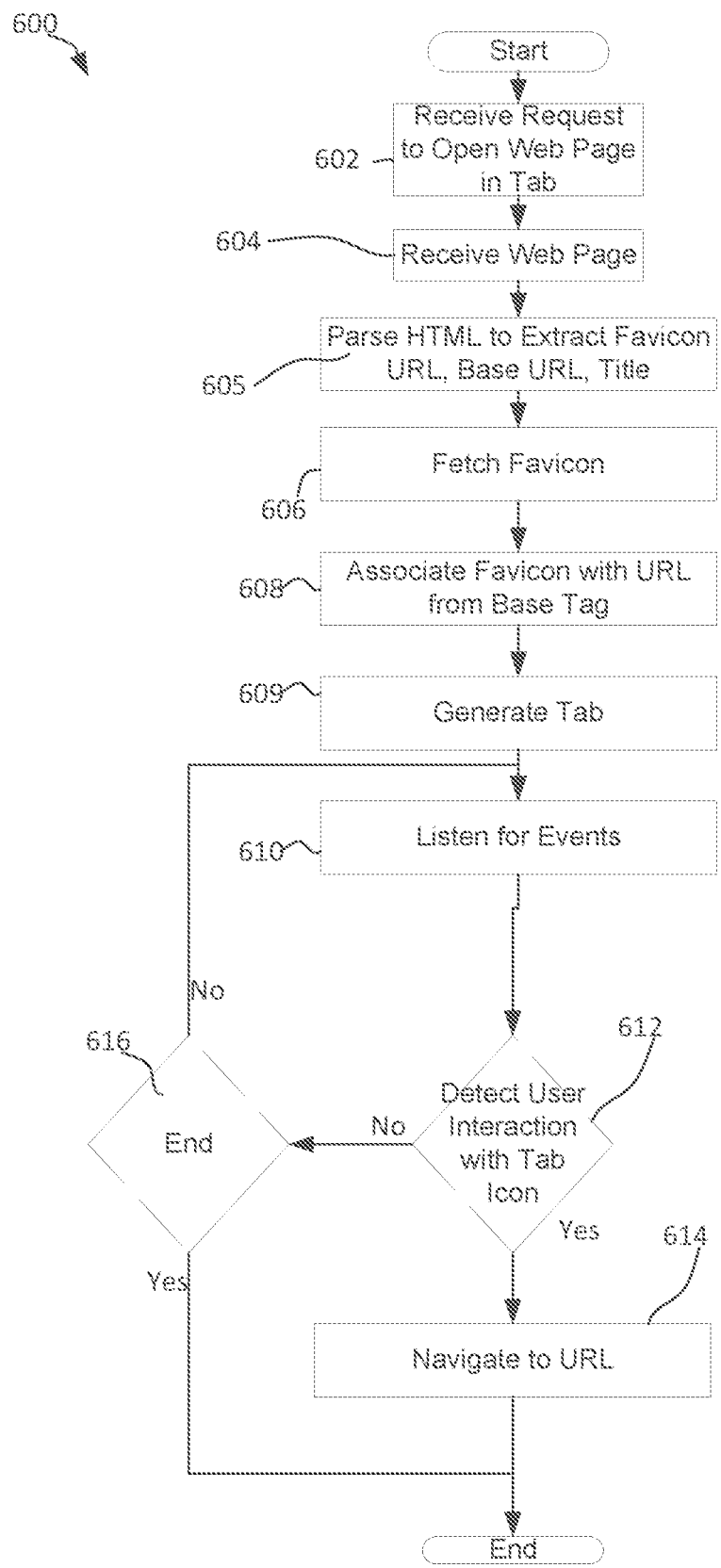
FIG. 6 is a flow chart of one embodiment of a method for web page navigation using tabs.

FIG. 6 is a flow chart illustrating one embodiment of a method 600 for web page navigation using tabs. In some embodiments, method 600 of FIG. 6 is embodied as computer-executable instructions on a non-transitory computer readable medium. In even more particular embodiments, method 600 is implemented by a web browser having enhanced navigation functionality. In some embodiments, the browser includes a browser extension that performs at least a portion of method 600.

At step 602, the browser receives and processes a request to open a web page in a browser tab. For example, the browser requests the web page. The browser receives the web page (step 604). The browser parses the HTML of the web page to identify and extract the Favicon URL, the base URL in the base tag of the web page and title specified in the title tag of the HTML of the web page (step 605). At step 606, the browser fetches the favicon using the favicon URL. At step 608, the browser associates the favicon with the URL from the base tag of the page HTML. In some embodiments, associating the favicon with the URL from the base tag of the page HTML comprises setting the tab link URL to the URL from the base tag of the page HTML.

At step 609, the browser generates the tab. According to one embodiment, generating the tab includes, for example, rendering a tab icon portion as a graphical user interface interactive element with which the user can interact by clicking on or otherwise interacting with the graphical user interface interactive element, and with the graphical user interface interactive element linked to the tab link URL. In the embodiment of FIG. 6, the favicon specified in the web page is used as the tab icon. Generating the tab further includes rendering a second portion of the tab as a graphical user interface interactive element that is not linked to the tab link URL. In some embodiments, the tab is generated by updating the tab in which the web page is being opened.

The browser listens for specified user interface events on the tab icon of the tab (step 610). If the browser detects a specified user interface event on the tab icon portion of the tab (step 612), the browser navigates to the tab link URL (step 614). In one embodiment, the browser opens the web page from the tab link URL in the same tab. In another embodiment, the browser opens the web page from the tab link URL in a new tab. The browser can continue to listen for events on the tab until an end condition is met, such as the browser closing the tab or other specified end condition (e.g., as determined at step 616).

FIG. 6 is merely an illustrative example, and the disclosed subject matter is not limited to the ordering or number of steps illustrated. Embodiments may implement additional steps or alternative steps, omit steps, or repeat steps.

Figure 7:
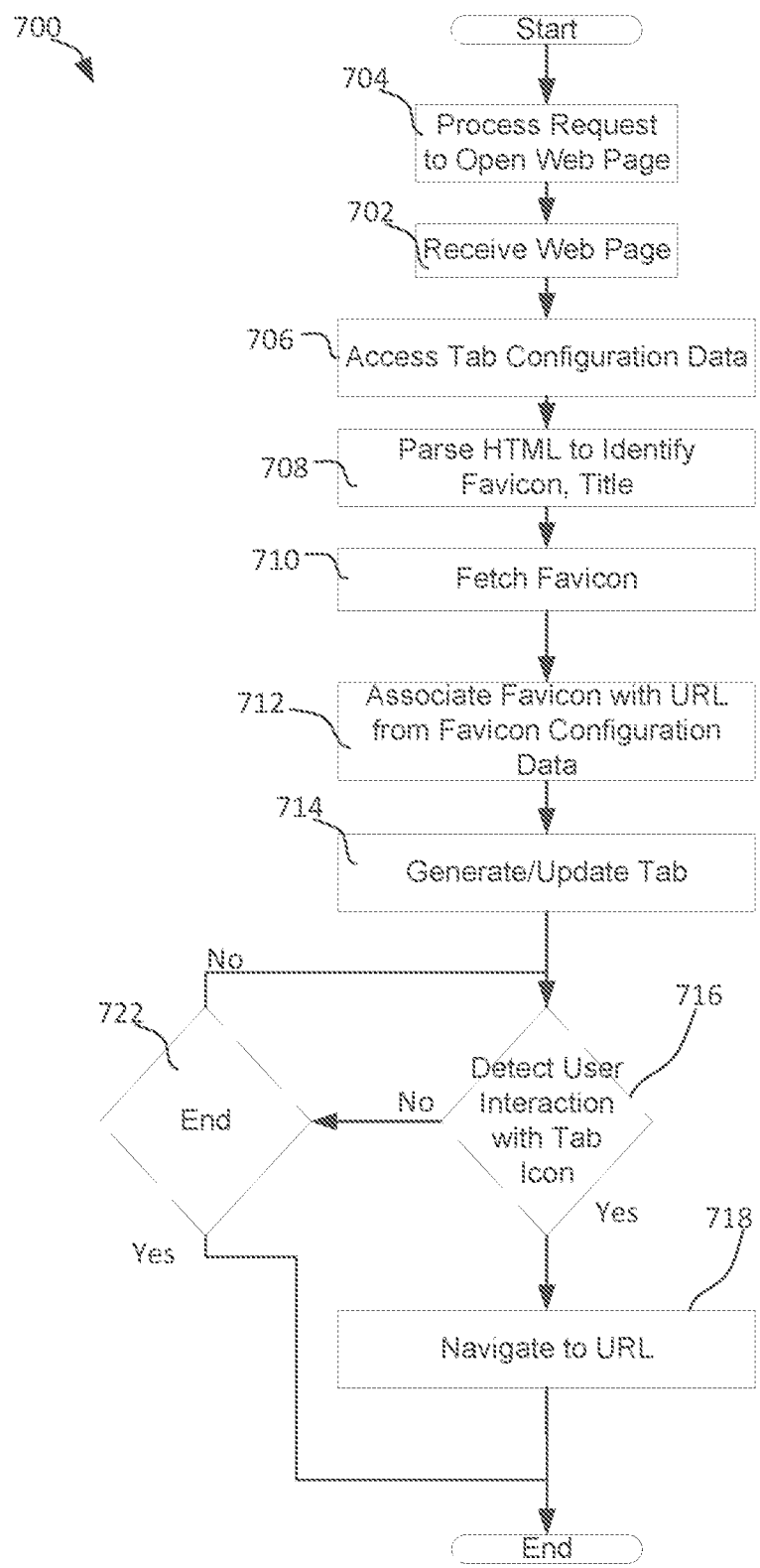
FIG. 7 is a flow chart of one embodiment of a method for web page navigation using tabs.

FIG. 7 is a flow chart illustrating one embodiment of a method 700 for web page navigation using tabs. In some embodiments, method 700 of FIG. 7 is embodied as computer-executable instructions on a non-transitory computer readable medium. In even more particular embodiments, method 700 of FIG. 7 is implemented by a web browser having enhanced navigation functionality. In some embodiments, the browser includes a browser extension that performs at least a portion of the method 700 of FIG. 7.

At step 702, the browser receives a request to open a web page in a browser tab. The browser requests the web page and receives the web page (step 704). The browser accesses tab configuration data (step 706). The tab configuration data, according to one embodiment, includes a URL to which to link the favicon for the web page based, for example, on the web page or the domain of the web page. As discussed in conjunction with FIG. 3 and FIG. 4, for example, the tab configuration data, in some embodiments, stores a user-specified tab link URL for a web page or web page domain.

The browser parses the HTML of the web page to identify and extract the favicon URL and title specified in the title tag of the HTML of the web page (step 708). At step 710, the browser fetches the favicon using the favicon URL. At step 712, the browser associates the favicon with the URL from the tab configuration data. For example, in some embodiments, the browser associates the favicon with a user-specified tab link URL for the web page or web page domain.

At step 714, the browser generates the tab. According to one embodiment, generating the tab includes, for example, rendering a tab icon portion as a graphical user interface interactive element with which the user can interact by clicking on or otherwise interacting with the graphical user interface interactive element, and with the graphical user interface interactive element linked to the tab link URL. In the embodiment of FIG. 7, the favicon specified in the web page is used as the tab icon. Generating the tab further includes rendering a second portion of the tab as a graphical user interface interactive element that is not linked to the tab link URL. In some embodiments, the tab is generated by updating the tab in which the web page is being opened.

The browser listens for specified user interface events on the tab icon of the tab (step 716). If the browser detects a specified user interface event with the tab icon portion of the tab (step 718), the browser navigates to the tab link URL (step 718). In one embodiment, the browser opens the web page from the tab link URL in the same tab. In another embodiment, the browser opens the web page from the tab link URL in a new tab. The browser can continue to listen for events on the tab until an end condition is met, such as the browser closing the tab or other specified end condition (e.g., as determined at step 722).

FIG. 7 is merely an illustrative example, and the disclosed subject matter is not limited to the ordering or number of steps illustrated. Embodiments may implement additional steps or alternative steps, omit steps, or repeat steps.

Figure 8:
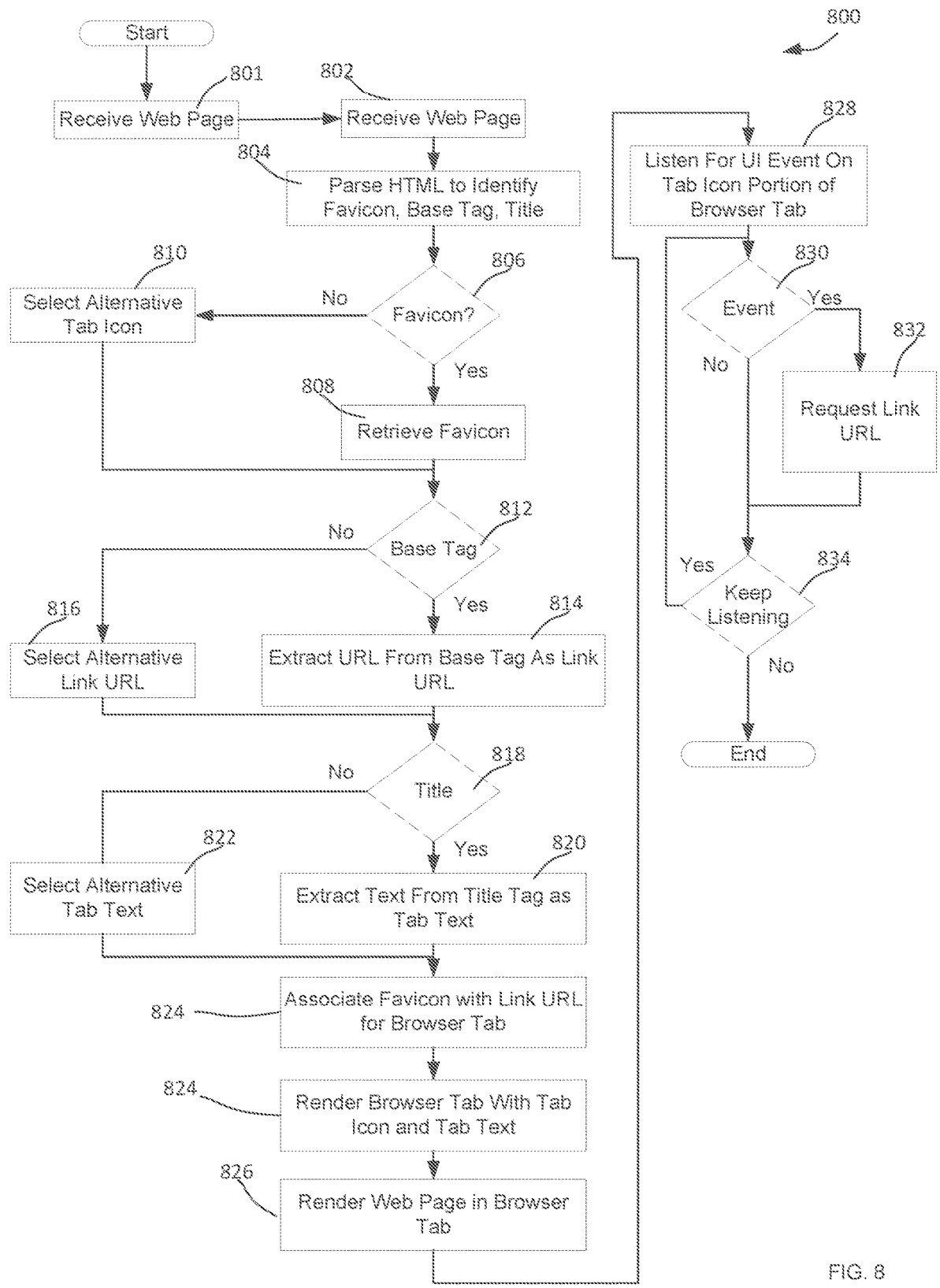
FIG. 8 is a flow chart of one embodiment of a method for web page navigation using tabs.

FIG. 8 is a flow chart illustrating one embodiment of a method 800 for web page navigation using tabs. In some embodiments, method 800 of FIG. 8 is embodied as computer-executable instructions on a non-transitory computer readable medium. In even more particular embodiments, method 800 of FIG. 8 is implemented by a web browser having enhanced navigation functionality. In some embodiments, the browser includes a browser extension that performs at least a portion of the method 800 of FIG. 8.

At step 801, the browser receives a request to open a web page in a browser tab. The browser requests the web page and receives the web page (step 802). The browser parses the HTML of the web page to identify the favicon, base tag, and title (step 804). If the browser is able to identify a favicon specified in the page, as determined at step 806, the browser retrieves the favicon as the tab icon (step 808). If the browser is unable to identify a favicon from the page—for example, because the web page does not specify the favicon or the HTML pattern designating the favicon is not recognized by the browser—the browser selects an alternative favicon (step 810). For example, the browser selects a default favicon in some embodiments.

If the browser is able to identify a base tag in the page header, as determined at step 812, the browser extracts the URL from the base tag as the tab link URL (step 814). If the browser is unable to identify a base tag in the page, the browser selects an alternative URL as the tab link URL (step 816). In some embodiments, the browser selects a default URL or a URL specified in the browser's configuration settings for the domain of the web page.

If the browser is able to identify a title tag in the page header, as determined at step 818, the browser extracts the title text from the title tag as the tab title (step 820). If the browser is unable to identify a title tag in the page, the browser selects alternative text as the tab title (step 822). In some embodiments, the browser selects a default title or other title specified in the browser's configuration settings.

The browser renders the browser tab using the tab icon and tab text determined for the tab (step 824) and displays the web page in the browser tab (step 826). According to one embodiment, generating the tab includes, for example, rendering a tab icon portion (or other linked portion) as a graphical user interface interactive element with which the user can interact by clicking on or otherwise interacting with the graphical user interface interactive element, and with the graphical user interface interactive element linked to the tab link URL. Generating the tab further includes rendering a second portion of the tab as a graphical user interface interactive element that is not linked to the tab link URL. In some embodiments, the tab is generated by updating the tab in which the web page is being opened.

The browser listens for specified user interface events on the tab icon portion of the tab (step 828). If the browser detects a specified user interface event with the tab icon portion of the tab (step 830) the browser navigates to the tab link URL (step 832). In one embodiment, the browser opens the web page from the tab link URL in the same tab. In another embodiment, the browser opens the web page from the tab link URL in a new tab. The browser continues to listen for events on the tab until an end condition is met, such as the browser closing the tab or other specified end condition (e.g., as determined at step 834).

FIG. 8 is merely an illustrative example, and the disclosed subject matter is not limited to the ordering or number of steps illustrated. Embodiments may implement additional steps or alternative steps, omit steps, or repeat steps.

It will be appreciated that embodiments also include listening for specified user interface events on the portions of the tabs that are not linked to the tab link URLs. For example, the browser of FIG. 1 listens for events on the non-icon portions of tabs 102, 104, 106 and processes these events to implement a variety of tab behaviors known or developed in the art, such as, but not limited to, switching between tabs. Furthermore, while embodiments have primarily been discussed in terms of linking the tab icon to the tab link URL, other embodiments may link the title or other tab element to the tab link URL.

Embodiments of the technology may be implemented on a computing system. Any combination of mobile desktop, server machine, embedded or other types of hardware may be used. Some embodiments described are implemented as part of a web browser's code. In other embodiments, the tabs application programming interface (API) is extended to allow browser extensions to perform operations such as determining and providing the tab link URL and registering listeners on various parts of the tabs to trigger actions.

Figure 9:
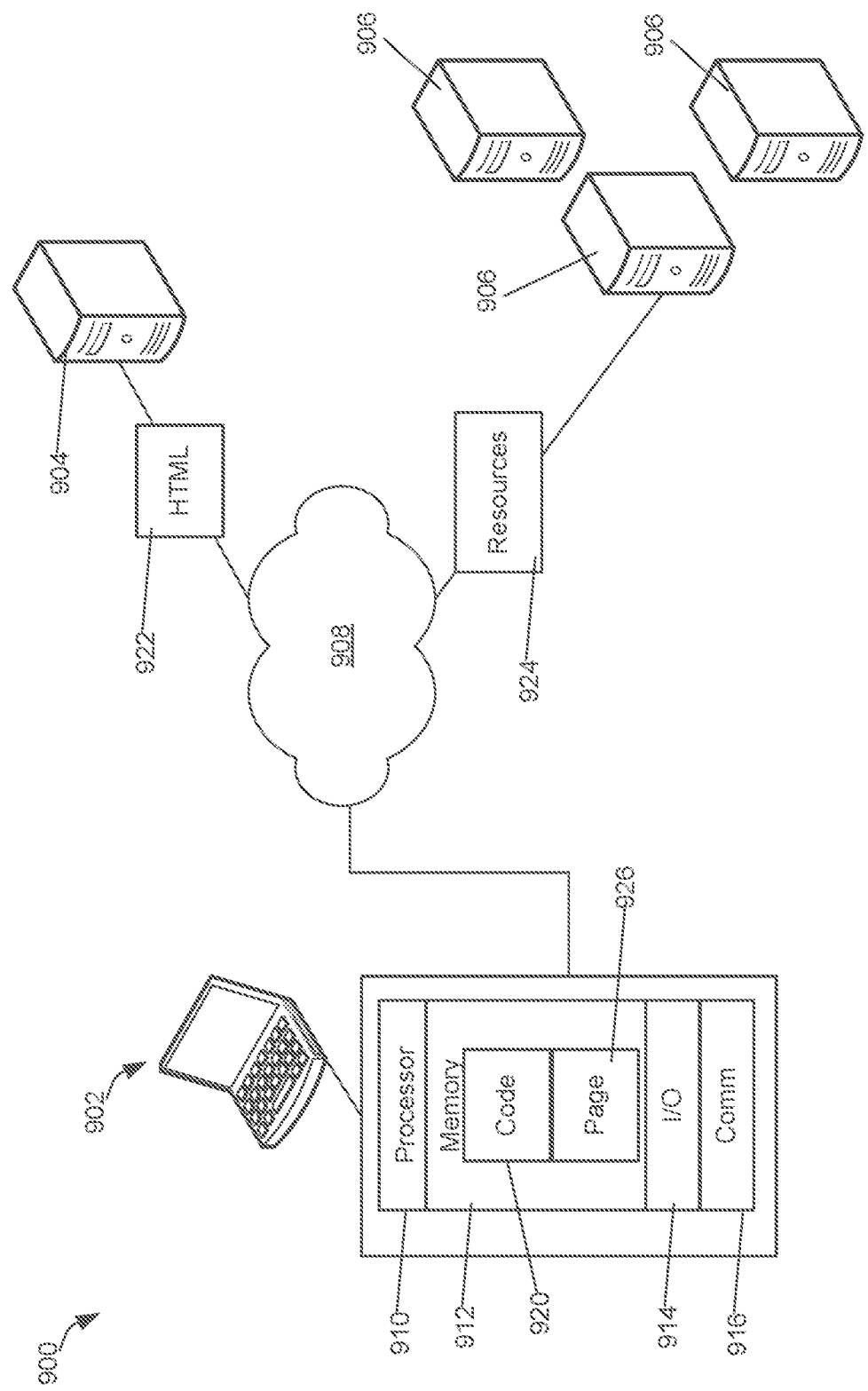
FIG. 9 is a diagrammatic representation of one embodiment of a network environment.

FIG. 9 is a diagrammatic representation of one embodiment of a distributed network computing environment 900 where embodiments disclosed herein can be implemented. The computing environment includes a client computer system 902, a server computer 904, and web resource computer systems 906 connected to a network 908 (e.g., a local area network (LAN), a wide area network (WAN) such as the Internet, mobile network, or other type of network or combination thereof). Network 908 may represent a combination of wired and wireless networks that network computing environment 900 may utilize for various types of network communications.

Client computer system 902 includes, for example, a computer processor 910 and associated memory 912. Computer processor 910 comprises an integrated circuit for processing instructions. Computer processor 910 may comprise various types of processors including, but not limited to a CPU. Computer processor 910, according to one embodiment, comprises one or more cores or micro-cores of a processor.

Memory 912 includes volatile memory, non-volatile memory, semi-volatile memory or a combination thereof. Memory 912, for example, may include RAM, ROM, flash memory, a hard disk drive, a solid-state drive, an optical storage medium (e.g., CD-ROM), or other computer readable memory or combination thereof. According to one embodiment, memory 912 implements a storage hierarchy that includes cache memory, primary memory or secondary memory. In some embodiments, memory 912 includes storage space on a data storage array. Client computer system 902 may also include input/output ("I/O") devices 914, such as a keyboard, monitor, printer, electronic pointing device (e.g., mouse, trackball, stylus, etc.), or the like. Client computer system 902 may also include a communication interface 916, such as a network interface card, to interface with network 908.

Memory 912 stores instructions executable by processor 910. For example, memory 912 may include an operating system and code 920 for a web browser or other program capable of implementing a tabbed interface. In an even more particular embodiment, code 920 is executable to provide a tabbed interface in which the tab icons (or other tab elements) are linked to tab link URLs.

Computer processor 910 executes code 920 to request a web page from server computer 904 and associate the web page with a tab. Server computer 904 returns responsive HTML 922, which may reference related resources 924.

Client computer 902 maintains page 926 may be the local representation of the web page retrieved from the network environment. Page 926, according to one embodiment, is associated with a particular tab that is open a browser window. As will be appreciated, during processing of page 926 to render it in a tab, the processor 910 may request related resources 924, such as style sheets, favicon files and other image files, video files, audio files and other related resources.

Although the invention has been described with respect to specific embodiments thereof, these embodiments are merely illustrative, and not restrictive of the invention. The description herein of illustrated embodiments of the invention, including the description in the Abstract and Summary, is not intended to be exhaustive or to limit the invention to the precise forms disclosed herein. Rather, the description is intended to describe illustrative embodiments, features, and functions in order to provide a person of ordinary skill in the art context to understand the invention without limiting the invention to any particularly described embodiment, feature, or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a computer communicatively coupled to a network (for example, the Internet), another computer, or in a standalone computer. As is known to those skilled in the art, a suitable computer can include a CPU, read-only memory ("ROM"), random access memory ("RAM"), hard drive ("HD"), input/output ("I/O") device(s), and communication interfaces. The I/O devices can include a keyboard, monitor, printer, electronic pointing device (for example, mouse, trackball, stylus, touch pad, etc.), or the like.

ROM, RAM, and HD are computer memories for storing computer-executable instructions executable by the CPU or capable of being compiled or interpreted to be executable by the CPU. Suitable computer-executable instructions may reside on a computer-readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. The processes described herein may be implemented in suitable computer-executable instructions that reside on a computer readable medium.

Any suitable programming language can be used to implement the routines, methods, or programs of embodiments of the invention described herein, including C, C++, Java, JavaScript, HTML, or any other programming or scripting code. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc.. The routines can operate in an operating system environment or as stand-alone routines. Functions, routines, methods, steps, and operations described herein can be performed in hardware, software, firmware, or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code any of the steps, operations, methods, routines, or portions thereof described herein, where such software programming or code can be stored in a computer-readable medium and can be operated on by a processor to permit a computer to perform any of the steps, operations, methods, routines, or portions thereof described herein. The invention may be implemented by using software programming or code in one or more general purpose digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semiconductor system, apparatus, system, device, propagation medium, or computer memory. Such a computer-readable medium shall generally be machine readable and include software programming or code that can be human readable (e.g., source code) or machine readable (e.g., object code). Examples of non-transitory computer-readable media include random access memories, read-only memories, HDs, data cartridges, magnetic tapes, floppy diskettes, flash memory drives, optical data storage devices, CD-ROMs, and other appropriate computer memories and data storage devices. As one skilled in the art can appreciate, a computer program product implementing an embodiment disclosed herein may comprise one or more non-transitory computer readable media storing computer instructions translatable by one or more processors in a computing environment.

A "processor" includes any hardware system, mechanism or component that processes data, signals, or other information. A processor can include a system with a general-purpose CPU, multiple processing units, dedicated circuitry for achieving functionality, or other systems. Processing need not be limited to a geographic location or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only to those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, that follow, a term preceded by "a set", "a" or "an" (and "the" when antecedent basis is "a" or "an") includes both singular and plural of such term, unless clearly indicated otherwise (i.e., that the reference "a set", "a" or "an" clearly indicates only the singular or only the plural). Also, as used in the description herein the meaning of "in" includes "in" and "on" unless the context clearly dictates otherwise.

Although the foregoing specification describes specific embodiments, numerous changes in the details of the embodiments disclosed herein and additional embodiments will be apparent to, and may be made by, persons of ordinary skill in the art having reference to this disclosure. In this context, the specification and figures are to be regarded in an illustrative rather than a restrictive sense, and all such modifications are intended to be included within the scope of this disclosure.

What is claimed is:

1. A method for enhanced website navigation, the method comprising:
   receiving a first web page at a web browser, the first web page comprising HTML;
   parsing the HTML of the first web page to identify a favicon;
   in response to identifying the favicon via parsing the HTML of the first web page, associating the favicon with a link to a second web page;
   displaying the first web page in a browser tab in a browser window of the web browser, the browser tab including the favicon identified via parsing the HTML, the favicon rendered as an interactive element in the browser tab;
   in response to displaying the first web page in the browser tab, listening for a user interface event with respect to the favicon rendered as an interactive element in the browser tab; and
   in response to detecting the user interface event with respect to the favicon, requesting the second web page.

2. The method of claim 1, further comprising requesting the first web page from a website that includes a home page and the first web page, wherein the second web page is the home page.

3. The method of claim 1, further comprising:
   parsing the HTML of the first web page for a base tag specifying a uniform resource locator; and
   extracting the uniform resource locator from the base tag, wherein associating the favicon with the link to the second web page comprises associating the favicon with the uniform resource locator extracted from the base tag.

4. The method of claim 1, further comprising determining a domain name with which the first web page is associated, and wherein associating the favicon with the link to the second web page comprises associating the first web page with the domain name.

5. The method of claim 1, further comprising storing tab configuration data for the web browser, the tab configuration data comprising a user specified uniform resource locator to associate with the first web page, wherein associating the favicon with the link to the second web page comprises associating the favicon with the user specified uniform resource locator.

6. The method of claim 1, further comprising registering an event listener to listen for a click event on the favicon.

7. The method of claim 1, further comprising opening the second web page in the browser tab.

8. A computer program product comprising a non-transitory, computer-readable medium storing a set of computer-executable instructions, the set of computer-executable instructions comprising instructions for:
   receiving a first web page, the first web page comprising HTML;
   parsing the HTML of the first web page to identify a favicon;
   in response to identifying the favicon via parsing the HTML of the first web page, associating the favicon with a link to a second web page;
   displaying the first web page in a browser tab in a browser window of a web browser, the browser tab including the favicon identified via parsing the HTML, the favicon rendered as an interactive element in the browser tab;
   in response to displaying the first web page in the browser tab, listening for a user interface event with respect to the favicon rendered as an interactive element in the browser tab; and
   in response to detecting the user interface event with respect to the favicon, requesting the second web page.

9. The computer program product of claim 8, wherein the set of computer-executable instructions further comprises instructions for requesting the first web page from a website, wherein the second web page is a home page of the website.

10. The computer program product of claim 8, wherein the set of computer-executable instructions further comprises instructions for:
    parsing the HTML of the first web page for a base tag specifying a uniform resource locator; and
    extracting the uniform resource locator from the base tag, wherein associating the favicon with the link to the second web page comprises associating the favicon with the uniform resource locator extracted from the base tag.

11. The computer program product of claim 8, wherein the set of computer-executable instructions further comprises instructions for determining a domain name with which the first web page is associated, and wherein associating the favicon with the link to the second web page comprises associating the first web page with the domain name.

12. The computer program product of claim 8, wherein the set of computer-executable instructions further comprises instructions for storing tab configuration data for the web browser, the tab configuration data comprising a user specified uniform resource locator to associate with the first web page, wherein associating the favicon with the link to the second web page comprises associating the favicon with the user specified uniform resource locator.

13. The computer program product of claim 8, wherein the set of computer-executable instructions further comprises instructions for registering an event listener to listen for a click event on the favicon.

14. The computer program product of claim 8, wherein the set of computer-executable instructions further comprises instructions for opening the second web page in the browser tab.

15. A web navigation system comprising:
    an input device;
    a display device;
    a processor coupled to the input device and the display device;
    a memory coupled to the processor, the memory storing a web browser, the web browser comprising a set of computer-executable instructions for:
        receiving a first web page, the first web page comprising HTML;
        parsing the HTML of the first web page to identify a favicon;
        in response to identifying the favicon via parsing the HTML of the first web page, associating the favicon with a link to a second web page;
        displaying the first web page in a browser tab in a browser window rendered on the display device, the browser tab including the favicon identified via parsing the HTML, the favicon rendered as an interactive element in the browser tab;
        in response to displaying the first web page in the browser tab, listening for a user interface event with respect to the favicon rendered as an interactive element in the browser tab; and
        in response to detecting the user interface event with respect to the favicon, requesting the second web page.

16. The web navigation system of claim 15, wherein the set of computer-executable instructions further comprises instructions for requesting the first web page from a website, wherein the second web page is a home page of the website.

17. The web navigation system of claim 15, wherein the set of computer-executable instructions further comprises instructions for:
    parsing the HTML of the first web page for a base tag specifying a uniform resource locator; and
    extracting the uniform resource locator from the base tag, wherein associating the favicon with the link to the second web page comprises associating the favicon with the uniform resource locator extracted from the base tag.

18. The web navigation system of claim 15, wherein the set of computer-executable instructions further comprises instructions for determining a domain name with which the first web page is associated, and wherein associating the favicon with the link to the second web page comprises associating the first web page with the domain name.

19. The web navigation system of claim 15, wherein the set of computer-executable instructions further comprises instructions for storing tab configuration data for the web browser, the tab configuration data comprising a user specified uniform resource locator to associate with the first web page, wherein associating the favicon with the link to the second web page comprises associating the favicon with the user specified uniform resource locator.

20. The web navigation system of claim 15, wherein the set of computer-executable instructions further comprises instructions for registering an event listener to listen for a click event on the favicon.

21. The web navigation system of claim 15, wherein the set of computer-executable instructions further comprises instructions for opening the second web page in the browser tab.

22. The web navigation system of claim 15, wherein the web browser comprises a web browser extension that comprises at least a portion of the set of computer-executable instructions.

\* \* \* \* \*